U̇nited States Patent Office 3,369,870
Patented Feb. 20, 1968

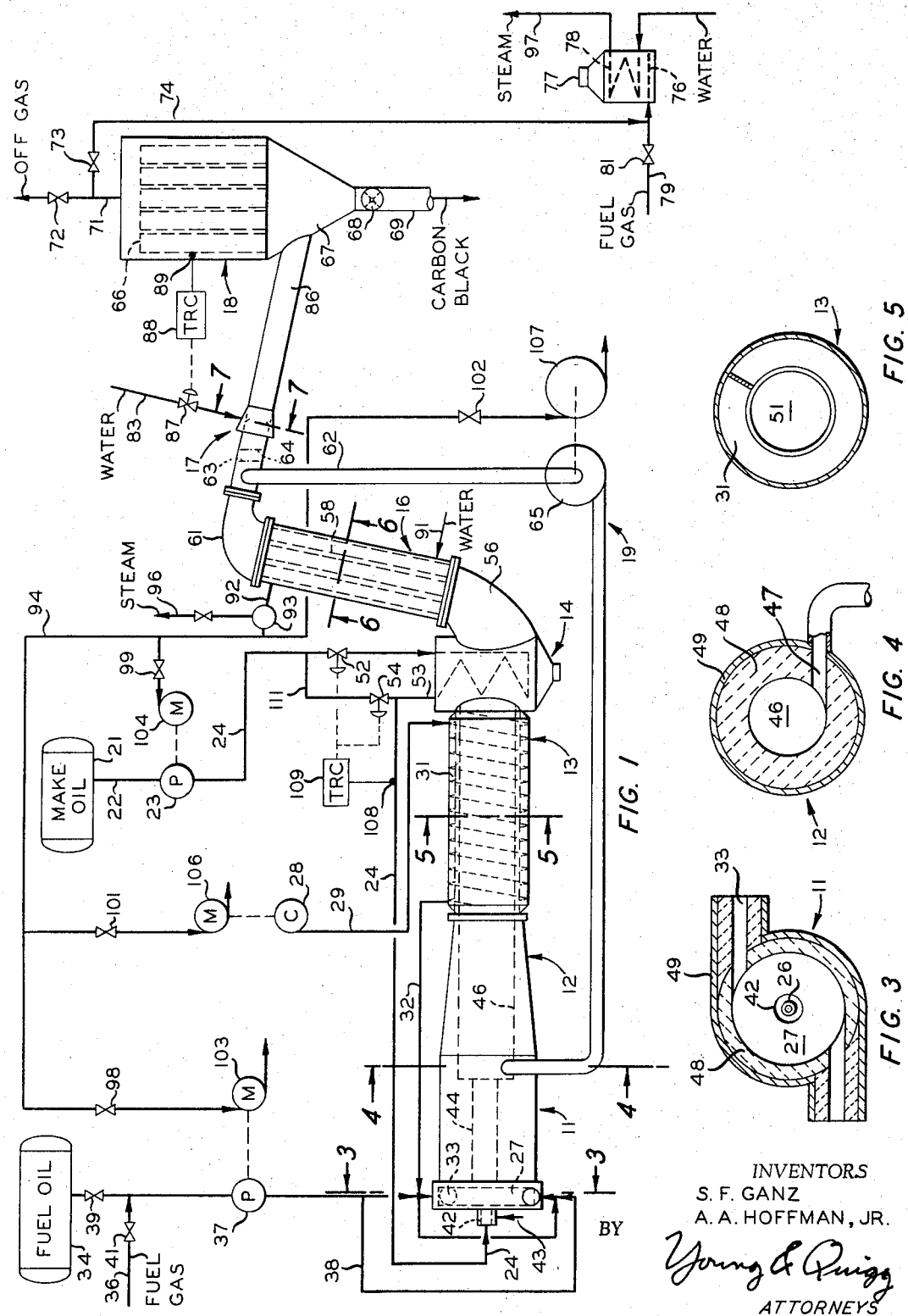

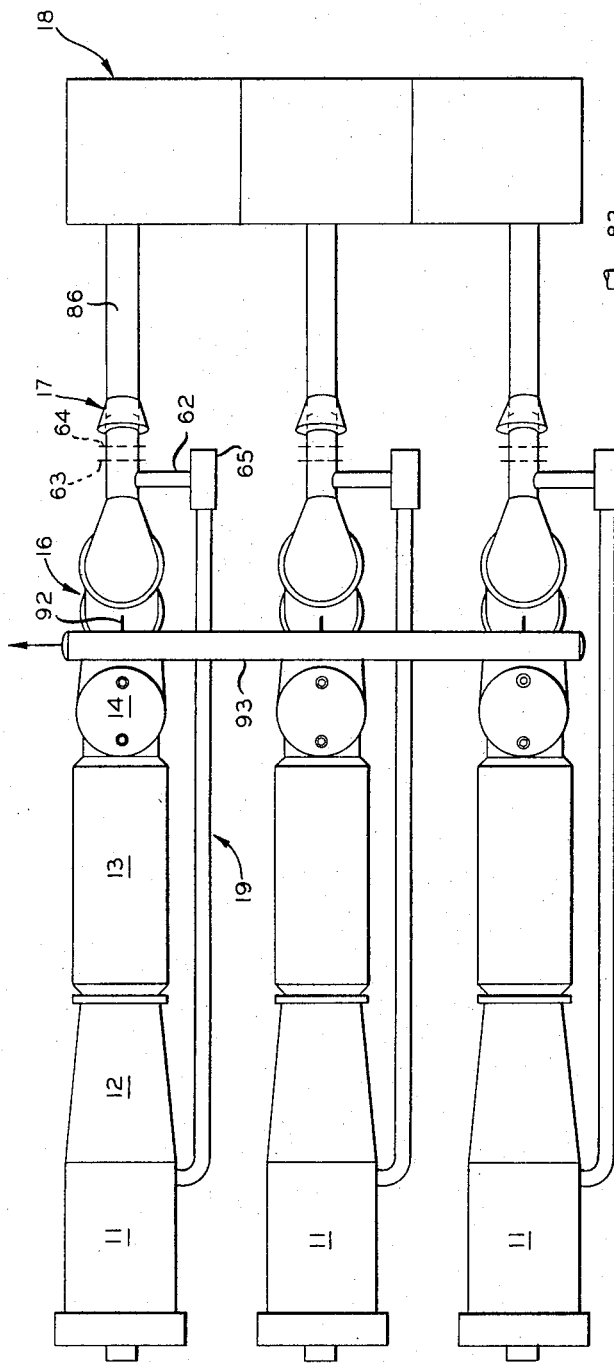
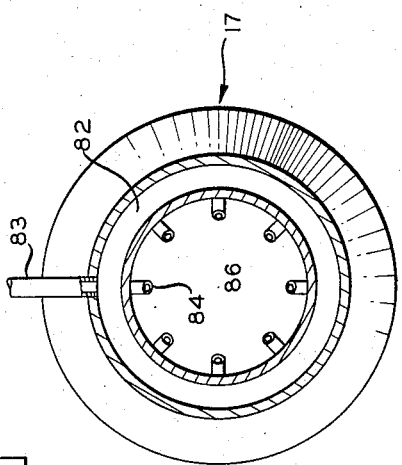
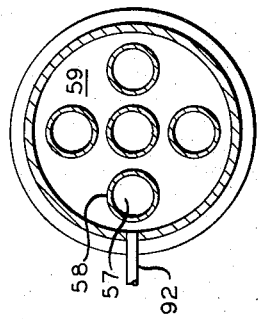

3,369,870
PROCESS AND APPARATUS FOR THE PRODUCTION OF CARBON BLACK
Stephen F. Ganz, Ferguson, Mo., and Alfred A. Hoffman, Jr., Bartlesville, Okla., assignors to Phillips Petroleum Company, a corporation of Delaware
Filed Nov. 2, 1964, Ser. No. 408,185
10 Claims. (Cl. 23—209.4)

ABSTRACT OF THE DISCLOSURE

Process and apparatus whereby hot smoke from a carbon black furnace is cooled, producing steam and cooled smoke. Some of the cooled smoke is recycled as a quench to the furnace, and the steam produced is used to power the pump causing the recycle. Additional cooling may be provided using air and/or make oil to the furnace, also pumped by said steam. A trim quench may be provided to maintain a constant temperature in the filter bags that is not too hot for their operation for a long time. The off gas separated from the produced carbon black contains much less water vapor than if a primary direct water spray quench had been used, and therefore is suitable for use as a fuel gas. The boiler may be tilted 10° to 20° to improve the heat exchange.

Description

This invention relates to carbon black furnaces and processes of operating the same. In one aspect, it relates to carbon black furnaces and processes in which the primary quench is recycled smoke from the furnace. In another aspect, it relates to apparatus and processes for cooling said smoke before recycle by indirect heat exchange with process air for said furnace, by indirect heat exchange with make oil for said furnace and/or indirect heat exchange with water to form steam. In another aspect, it relates to apparatus and processes of utilizing said steam to drive a compressor for said air, to drive a compressor for said recycled off gas, and/or to drive a pump for said make oil, and to drive pumps for fuel oil or fuel gas when fuel as well as make oil is used in said furnace. In another aspect, it relates to carbon black furnaces and processes in which only a very minor portion of the quenching is done with water spray so that the volume of off gas is reduced from that from a similar furnace with a water spray primary quench, but the heating value of the off gas is raised by not containing much water vapor to a value great enough to make the off gas suitable as fuel in auxiliary furnaces, such as a steam-generating boiler heating installation. In another aspect, it relates to recycling smoke instead of off gas as a quench in order to reduce the size of the bag filter.

In the prior art it has been common practice in carbon black furnaces to quench the effluent smoke coming from the furnace with a water spray in order to quickly lower the temperture of said smoke below the reaction temperature of the carbon black therein, and to reduce the smoke temperature below the temperature which would endanger the glass cloth, or other fiber bags employed in the conventional bag filter in order to collect the carbon black. This prior art system is wasteful in a number of ways. By relying almost entirely upon evaporation of sprayed water as the quench, the off gas from the process is so diluted with water vapor that it is not suitable for use as fuel, and therefore is wasted to the atmosphere. None of the heat from the process is recovered as useful heat. And finally, the bag filtering system has to be designed at least 20 percent larger in order to accommodate the volume of added water vapor.

In the present invention carbon black furnaces and processes are disclosed in which the primary quench consists of recycled smoke from the furnace, thereby substantially reducing the amount of water vapor present in the off gas coming from combustion of fuel and make oil and from a small temperature-trimming water quench which merely regulates the final temperature of the smoke entering the bag filter to protect the filter bags from destruction by excessively high temperatures. The amount of water vapor in the smoke is further reduced by cooling the effluent smoke by indirect heat exchange with compressed air going to the carbon black furnace process, and further reduction of water vapor content is obtained by heating the make oil going to the carbon black furnace by indirect heat exchange with said smoke and by passing said smoke through the fire tubes of a steam boiler. Further, by recycling smoke instead of off gas as a quench, the amount of gas passing through the bag filter is reduced by one-third, which means the bag filter can be only two-thirds as large, which saves considerable money in plant investment.

One object of the present invention is to provide improved carbon black furnace quenching apparatus and processes of using the same.

Another object is to quench a carbon black furnace with cooled and recycled smoke from the same furnace, and thereby reduce the water vapor present in the off gas later separated from the carbon black, with sufficiently improved heating value to the off gas to enable it to be used as a fuel gas.

Another object is to conserve heat and therefrom commercially produce useful amounts of steam at a sufficient temperature and pressure to run steam engines or steam turbines.

Another object is to recycle smoke instead of off gas as a quench and thereby enable the size of the bag filter to be reduced.

Other objects are to provide power to run the compressors and pumps to supply air and make oil to the process, and to preheat said air and make oil.

Numerous other objects and advantages will be apparent to those skilled in the art upon reading the accompanying specification, claims and drawings.

In the drawings:

FIGURE 1 is an elevational view with one part in cross section of a carbon black furnace, quench, bag filter and steam generator embodying the present invention.

FIGURE 2 is a plan view of three carbon black furnaces of the type shown in FIGURE 1 and the quench sections attached thereto.

FIGURES 3, 4, 5, 6 and 7 are cross-sectional views of FIGURE 1 taken along the lines 3—3, 4—4, 5—5, 6—6 and 7—7, respectively, looking in the direction indicated.

In FIGURE 1 a carbon black furnace generally designated as 11 is shown with a recycle smoke quench section generally designated as 12, an indirect heat exchange process air preheating section generally designated as 13, an indirect heat exchange make oil preheating section generally designated as 14, a tilted waste heat fire-tube steam boiler generally designated as 16, a temperature-trimming water spray quench section generally designated as 17, and a bag filter for separating carbon black from off gas generally designated as 18, connected together in series, along with a smoke recycle system generally designated as 19.

Carbon black furnace 11 may be any carbon black furnace of the prior art, and therefore is not described in great detail. For example, it may be the furnace of either Krejci U.S. Patents 2,375,795 of May 15, 1945; 2,564,700 of August 21, 1951; or 2,641,524 of June 9, 1953.

In such a furnace 11 carbon black make oil from tank 21 passing through line 22 is pumped by pump 23 through line 24 through axial inlet 26, axially into generally cylindrical chamber 27. Simultaneously, air from the atmosphere is compressed by compressor 28 and passed through line 29 through helical annulus 31, conduit 32 and tangential tunnels 33 tangentially into chamber 27 where it may burn a portion of said make oil and pyrolyze the remainder to form carbon black, or if desired the burning of the make oil may be reduced or eliminated by substituting other fuel, such as fuel oil from tank 34 and/or fuel gas from line 36 pump, if necessary, by pump 37 through line 38 through tunnel 33 along with air 32 tangentially into chamber 27. Whether fuel oil 34 or fuel gas 36, or both, or neither, are employed will depend on whether valves 39 and 41 are open or closed. While chamber 27 can be generally cylindrical and the only chamber in furnace 11, it is preferred that chamber 27 be supplemented by additional chambers of reduced diameter connected in communication axially therewith. Reduced diameter chamber 42 is spaced around axial nozzle 26 and, if desired, a gas may be introduced from pipe 43 into the annulus between 42 and nozzle 26. This annulus gas, while not essential, is generally employed because it reduces carbon deposition on the outside of nozzle 26 and also cools the same, and in the prior art the various gases such as air, methane, hydrogen, carbon dioxide or nitrogen have been suggested as gas 43.

While only hydrocarbon make oil from tank 21 is shown, it should be obvious that a hydrocarbon make gas from tank 21 may be substituted, as the above-cited Krejci patents teach that any hydrocarbon from methane to crude oil can be used as the axial make hydrocarbon. However, as the oil is so much more productive than any gas, it is not believed necessary to show the use of gas, but obviously make hydrocarbon gas from tank 21 could be preheated in 14 and passed to inlet 26 and would not need to be vaporized or sprayed.

While chamber 27 could continue the length of the furnace, it is preferred that chamber 27 be of diameter greater than its width and be connected to a reaction chamber 44 of smaller diameter and having a length greater than its diameter. While reaction chamber 44 could be the same diameter as the quench chamber 46 immediately following and connected thereto, it is preferred to have the quench section 12 provided with a chamber 46 with diameter enough greater than chamber 44 to allow the recycle of smoke 19 to enter tangentially through tunnel 47 without increasing the velocity of gas through chamber 46 over its velocity through chamber 44. Both furnace 11 and quench section 12 are constructed of heat-insulating refractory material 48 covered by steel shell 49. Suitable refractories are named in the prior art, and the steel of the shell is really not essential except that it adds strength and resists accidental breaking of the refractory.

The incomplete combustion in chambers 27 and 44 is quenched in chamber 46 by recycle smoke 19, and the resulting smoke passes through central passage 51 of heat exchanger 13 in the indirect heat exchange with the air being pumped through helical annulus 31. The smoke then passes through the interior of oil preheater 14 in indirect heat exchange with make oil passing from line 24 through valve 52 and coil 53 back into line 24 downstream of valve 54.

The smoke having passed through heat exchanger 14 then runs through elbow 56 into the bore 57 of fire tubes 58 of waste heat boilers 16. It will be noted that fire tubes 58 are tilted at least 10 degrees and preferably 12 degrees to 20 degrees from the vertical in order to allow water vapor bubbles to break away and rise upward through the water in space 59 in boiler 16 instead of clinging to the walls of the tubes, thereby improving the transfer coefficient in transferring heat from smoke in bore 57 to the water in space 59.

The temperature of the smoke in chamber 44 was above 2000° F. and preferably was in the neighborhood of 2700° F., but when it was mingled with the recycle smoke at about 400° F. to 600° F. and preferably at 460° F. to 500° F. coming from 19 in chamber 46, the smoke was rapidly quenched to below 1800° F., preferably about 1700° F. As a result the air in line 32 is at approximately 1700° F. and the temperature of the smoke leaving exchanger 13 and entering exchanger 14 is about 1515° F., which permits heating of oil in line 24 to about 550° F. As the smoke travels through elbow 56 and enters heat exchanger 16, it is at about 1460° F. and as it leaves through elbow 61 the smoke has reached about 500° F., at which temperature a portion is recycled in some cases with some further cooling through pipe 62 and blower 65 of smoke recycle system 19 through tangential tunnel 47 into chamber 46 to quench the smoke coming through reaction chamber 44.

The major portion of the smoke proceeds through trimming quench 17 into bag filter 18, the exact proportion being passed or recycled, depending on the position of one or more butterfly valves or dampers 63 and 64. The temperature-trimming quench maintains the smoke at a selected temperature below 500° F., and for glass fabric bags preferably at exactly 450° F. as it passes into bag filter 18. If the smoke is much hotter than 450° F., it may injure the glass fabric bags 66 in bag filter 18, but at the same time considerable cooling occurs in filter 18 and it is not desirable to have the off gas cool below its dew point, which would result in condensation of water and corrosion and other difficulties in the bag filter.

The smoke from trimming quench 17 is separated in bag filter 18 by fabric bags 66, the carbon black suspended in the smoke falling to the bottom of cone 67 and being passed, when desired, through star valve 68 into line 69. The off gas, passing through filter bags 66, emerges through pipe 71 from which some, or all, can be vented through valve 72 or passed through valve 73 to serve as fuel in line 74 and burner 76 of furnace 77 where it heats water in coil 78 to produce steam. In starting the burner 76 it may be desirable to use an extraneous fuel gas 79, but once the burner 76 is being supplied with burning gas from line 74, valve 81 can be closed and the operation continued entirely with off gas 74 because of its low water vapor content. This would be impossible if all the quenching had been with a water spray 17 as in the prior art, instead of using smoke quench 19 and heat exchange at 13, 14 and 16 to remove most of the heat from the smoke.

The details of quench 17 are shown in FIGURE 7 where water enters annulus 82 from pipe 83 and from there is sprayed through radial spray nozzles 84 into the smoke-transmitting bore 86 of trimming quench 17. The amount of water through pipe 83 is regulated by valve 87 controlled by temperature-recording controller 88 which is connected to a thermocouple 89 as suitable place in the bag filter 18 so that just enough water enters trimming quench 17 to keep the temperature of gas passing from 86 into 67 at about 450° F. when glass fabric filter bags 66 are employed. If cloth, linen, Orlon, or plastic filter fabrics of the prior art are employed, the temperature will have to be adjusted in controller 88 to whatever the maximum temperature may be that is desirable with such bags of other materials than glass. We only recommend glass filter bags, but of course the others can be used if desired.

Water is added to space 59 of steam boiler 16 through line 91 to make up for the steam emerging through line 92. There are many suitable devices in the prior art for adding boiler feed water 91 and maintaining a suitable water level in space 59, so it is believed unnecessary to show any such equipment. The steam from line 92 collected in steam header 93 is at about 422° F. and 315 p.s.i.a., and about 4360 pounds per hour may be furnished to line 94 to power the various turbines and pumps shown while about 6840 pounds per hour is available through line 96 for sale for other uses. The amount of steam produced through line 97 from coil 78 of furnace 77 depends on how much off gas 74 is burned, and for the installation shown the rate of off gas flow through line 71 varies from about 16,000 to about 17,000 standard cubic feet per minute, depending on whether fuel is being added through line 38 or not.

Steam from line 94 may be fed as desired through valves 98, 99, 101 and 102, respectively, to power steam engines, motors or turbines 103, 104, 106 and 107, respectively, to drive pumps or compressors 37, 23, 28 and 65, respectively.

The control of the temperature of the furnace 11 is such that it is not necessary to trim the temperature of air passing through compressor 28 through line 29, annulus 31 and line 32. However, in many instances it is preferable to have some control of the preheating of make oil in line 24 and this is done by taking the temperature of line 24 at thermocouple 108 and supplying a signal to temperature-recorder controller 109 which then adjusts the position of opening of valves 52 and 54 so that the proper amount of make oil is bypassed through line 111 to maintain the temperature of the oil at the desired temperature. This desired temperature is about 550° F., which is sufficient so that as the oil passes through line 24 into chamber 27 preferably about 80 percent vaporizes almost instantly in chamber 27. However, it is not necessary that it vaporize, as operations in which the oil is sprayed axially into the furnace are shown in Arnold, U.S. Patent 2,617,-714 (1952), and Ayres, U.S. Patent Re. 22,886 of June 3, 1947. Because of the use of the gas quench and other features of the present invention, the moisture content of the off gas is only 10.75 weight percent compared with 44 percent for only using a water quench. This lower moisture content decreases corrosion, reduces the number of bag filters required by one-fifth, and reduces the size of the off gas blower, if one is used in line 71, by 40 percent. This lower moisture content not only increases the B.t.u. content of gas in burner 76, but it also lessens fouling and corrosion of furnace 77 or any other equipment in which it is used. The helical air preheater 13 is of much lower cost than the shell and tube preheaters of the prior art and operates with a minimum of fouling and lower maintenance costs. The increased heat value of the off gases 71 makes combustion possible with little or no oil or gas enlargement because the B.t.u. per standard cubic foot of off gas 71 of the present invention is about 77.1 as compared to only 56.5 where water quenching alone is employed in the prior art.

It will be noted that about 1,000,000 s.c.f.h. of off gas is emerging from the bag filter through pipe 71 while about 500,000 s.c.f.h. of smoke is being recycled through pipe 19 for each furnace, so by using recycled smoke in 19 instead of recycled off gas from pipe 71 as the quench gas the capacity of the bag filter 18 can be reduced by one-third. This saves considerable money in plant investment, because the bag filters are quite expensive.

While a specific embodiment of the invention has been shown for illustrative purposes, it is believed obvious that the invention is not limited thereto.

Having described our invention, we claim:

1. A process of quenching a carbon black furnace process in which a heated free oxygen-containing gas and a heated carbon black make hydrocarbon are subjected to partial combustion and pyrolysis in a reaction zone to form a hot smoke having a temperature above 2000° F. comprising solid carbon black particles suspended in off gas, comprising the steps of:

quenching said hot smoke rapidly to a temperature below 1800° F. as it emerges from said reaction zone by injecting into it cooled recycle smoke subsequently to be described having a temperature from about 400 to 600° F.;

cooling said hot smoke further by indirect heat exchange with said free oxygen-containing gas going to said furnace process;

cooling said hot smoke further by indirect heat exchange with said make hydrocarbon going to said furnace process;

cooling said hot smoke further by indirect heat exchange with water to form steam and produce said cooled smoke;

recycling a portion of said cooled smoke to said quenching step;

using at least a portion of said steam to drive means to move said make hydrocarbon, said free oxygen-containing gas, and said recycled smoke through said processes;

directly water spray cooling the remaining portion of said cooled smoke to a predetermined temperature below 600° F.;

filtering out the solid carbon black particles in said smoke from the remaining off gas;

utilizing said off gas as a fuel gas having a reduced water content over what it would have if the major portion of the cooling were by direct water spraying; and collecting said carbon black as a product.

2. A process of quenching a carbon black manufacturing furnace process, in which a free oxygen-containing gas and a carbon black make hydrocarbon are subjected to partial combustion and pyrolysis in a reaction zone to produce a hot smoke comprising solid carbon black particles suspended in off gas, comprising the steps of:

passing the produced smoke from the reaction zone combined with recycled smoke subsequently to be described through an indirect heat exchange zone in heat exchange with water therein and thereby producing separately steam and cooled smoke;

recycling a first portion of said cooled smoke produced in said heat exchange zone into said hot smoke passing from said reaction zone to quench said hot smoke before the combined smoke passes through said indirect heat exchange;

using a portion of said steam to drive means to move said recycled first portion of smoke through said recycle;

passing the remaining second portion of said cooled smoke from said heat exchange zone into a filtering zone;

filtering out the solid particles of carbon black in said second portion of said cooled smoke from the remaining off gas; and collecting said carbon black as product.

3. The process of claim 2, which comprises the additional steps of indirect heat exchange between said free oxygen-containing gas and said combined smoke before said combined smoke passes in heat exchange with said water; and using a portion of said steam to drive means to move said free oxygen-containing gas through said heat exchange with said combined smoke and into said reaction zone.

4. The process of claim 3, which comprises the additional steps of indirect heat exchange between said carbon black make hydrocarbon and said combined smoke after said combined smoke passes in heat exchange with said free oxygen-containing gas and before said combined smoke passes in heat exchange with said water; and using a portion of said steam to drive means to move said carbon black make hydrocarbon through said heat exchange with said combined smoke and into said reaction zone.

5. The process of claim 2 which comprises the additional step of using at least a portion of the off gas from the filtering zone as a fuel gas.

6. The process of claim 2 which comprises the additional step of further quenching the portion of said cooled smoke passing from said heat exchange zone with said water into said filtering zone by a direct water quench to the degree necessary to maintain a predetermined constant temperature in said filtering zone.

7. Carbon black producing apparatus comprising in combination:

a heat-insulated carbon black furnace having therein an incomplete combustion reaction chamber, said chamber having a hot smoke outlet line connected in series downstream to a waste heat boiler and the inlet of a filter; said chamber having a first inlet for a free oxygen-containing gas; and a second inlet for carbon black make hydrocarbon;

said boiler having an inlet for water, and an outlet for steam;

a recycled smoke quench line connecting said smoke outlet line at a first point between said boiler and said filter with said smoke outlet line at a second point between said reaction chamber and said boiler;

pumping means in said recycled smoke line disposed to recycle said smoke from said first to second point;

a steam engine connected to drive said pumping means; and means connecting the outlet for steam of said boiler to said steam engine.

8. The combination of claim 7, in which there is:

a first heat exchanger having a smoke inlet and outlet connected in the smoke outlet line between said second point and said boiler, and having a gas inlet and outlet;

a supply line for said free oxygen-containing gas containing gas pumping means connected to the gas inlet and thence to the gas outlet of said first heat exchanger and the first inlet to said chamber in series; and steam driven means connected to the steam outlet of said boiler disposed to drive said gas pumping means.

9. The combination of claim 8, in which there is:

a second heat exchanger with a smoke inlet and outlet connected in the smoke outlet line between the first heat exchanger outlet and the waste boiler inlet and having a make hydrocarbon inlet and outlet;

a supply line for said make hydrocarbon containing a pumping means connected to the make hydrocarbon inlet and thence to the make hydrocarbon outlet of said second heat exchanger and to the second inlet of said chamber in series; and steam driven means connected to the steam outlet of said boiler and disposed to drive said make hydrocarbon pumping means.

10. The combination of claim 7 in which the boiler is a fire tube boiler with the fire tubes in the smoke outlet line tilted 10° to 20° from vertical.

References Cited

UNITED STATES PATENTS

| | | | |
|---|---|---|---|
| 2,781,246 | 2/1957 | Goldtrap | 23—209.4 |
| 2,844,443 | 7/1958 | King | 23—209.6 |
| 3,095,272 | 6/1963 | Naifeh | 23—209.4 |
| 3,095,273 | 6/1963 | Austin | 23—209.6 |
| 3,310,379 | 3/1967 | Hinson et al. | 23—209.4 |

EDWARD J. MEROS, *Primary Examiner.*